Oct. 25, 1960   E. BACKHAUS   2,957,731
CHAIN-LINK CONNECTING PART FOR TRACK CHAINS
Filed April 23, 1959   2 Sheets-Sheet 1

INVENTOR
Erwin Backhaus
By
Lowry & Rinehart
ATTYS.

Oct. 25, 1960     E. BACKHAUS     2,957,731
CHAIN-LINK CONNECTING PART FOR TRACK CHAINS
Filed April 23, 1959     2 Sheets-Sheet 2

INVENTOR
Erwin Backhaus
BY
ATTYS.

United States Patent Office 2,957,731
Patented Oct. 25, 1960

2,957,731
CHAIN-LINK CONNECTING PART FOR TRACK CHAINS

Erwin Backhaus, 18A Ehringhausen, Remscheid, Germany

Filed Apr. 23, 1959, Ser. No. 808,523

Claims priority, application Germany Sept. 1, 1958

4 Claims. (Cl. 305—41)

The present invention relates to a chain-link connecting part for track chains.

In known chain-link connecting parts the connection between the chain bolts and the individual chain links is established by means of wedge screws which are supposed to produce a self-protecting effect. However, in practical use it has been found out that because of the rough and sturdy operating conditions which track chain vehicles have to undergo the heads of the wedge screws are frequently crushed away, so that that safeguarding effect supposed to be produced by them is eliminated, and that in addition to this the ends of the chain bolts positioned in supporting holes of the chain-link connecting parts are damaged and deformed to such a degree that the chain-link connecting parts provided with the wedge screws are bound to wear out quickly.

Hence, the invention has for its object to provide a chain-link connecting part in which the aforementioned deficiencies do not exist.

The main feature of the invention consists in that the chain-link connecting part is provided with a slot terminating at both ends in supporting holes for appertaining chain bolts, whereby the slot is traversed by a screw bolt screwed into the chain-link connecting part and which has its head positioned within a contracted surface portion corresponding in height to the height of the head of the bolt and positioned on the upper surface of the chain-link connecting part.

When the screw bolt is tightened the slot contracts with the result that the supporting holes of the chain-link connecting part embrace the chain bolts positioned in the supporting holes in vice-like gripping fashion and reliably secure them in position whereby the clamping effect is increased by the polygonal cross section (for example eight-angled or twelve-angled cross section) of the supporting holes. In addition to this the crushing-away of the heads of the bolts is reliably prevented by the fact that said heads are positioned in the contracted surface portion on the upper surface of the chain-link connecting part.

Another feature of the invention consists in that the screw bolt may be supported in a nut located in the chain-link connecting part and adapted for tightening with respect to the chain-link connecting part, and by means of which the clamping effect is transferred to the chain bolts.

In order to prevent the chain bolts from axially shifting within the supporting holes it is proposed to provide the nut at its circumference with two oppositely projecting wings extending parallel to each other in vertical direction. By means of these wings the nut engages in correspondingly positioned grooves of the chain bolts.

Additional features and advantages of the invention will be understood from a consideration of the following detailed description taken in connection with the accompanying drawings forming a part of this specification and in which two preferred embodiments of the invention have been shown by way of example.

In the drawings, in which like parts are referred to by the same reference numerals, Fig. 1 is a top plan view of a chain-link connecting part according to the invention;

Figure 1:
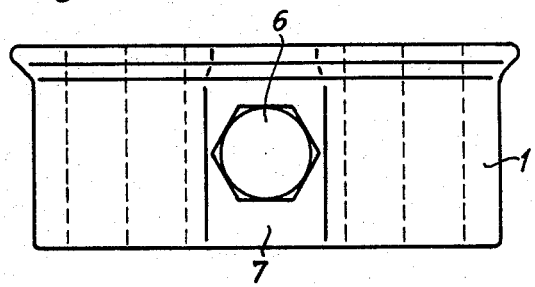
Figure 2:
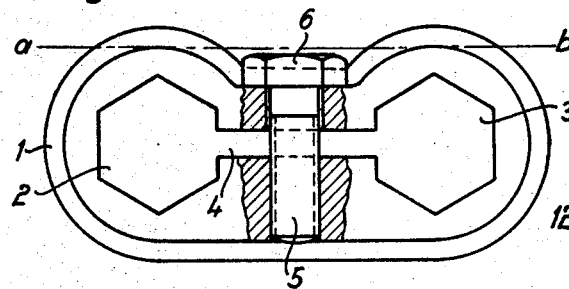
Fig. 2 is a front elevational view, partly in section, of the chain-link connecting part.
Figure 3:
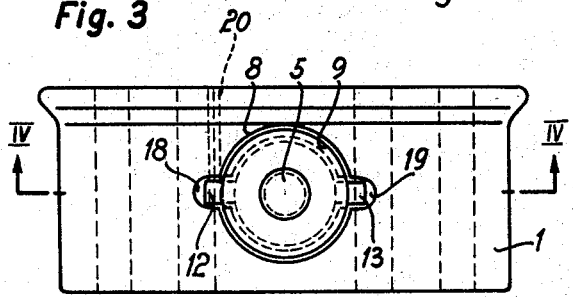
Fig. 3 is a view similar to Fig. 1, of another form of the invention, showing the chain-link connecting part provided with a nut for a screw bolt.
Figure 4:
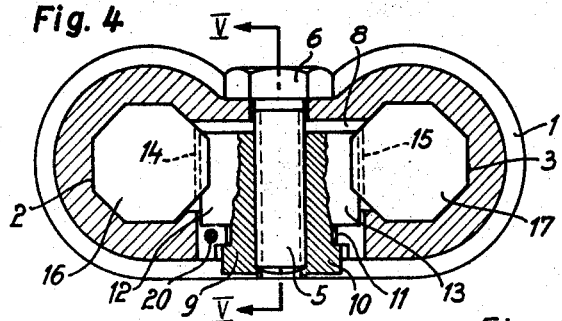
Fig. 4 is a cross section on line IV—IV of Fig. 3.

Figs. 1 and 2 show a chain-link connecting part 1, having oppositely disposed supporting holes 2 and 3 for the chain bolts which are not illustrated. 4 is a slot which terminates at both ends in the supporting holes 2 and 3 and which is traversed by a screw bolt 5 screwed into the chain-link connecting part 1. The screw bolt 5 has its head 6 located in a contracted portion 7 on the upper surface of the chain-link connecting part 1. The contracted portion 7 corresponds in size to the height of the head 6 of the screw bolt 5, so that the head 6 is located beneath the highest points of the working surface of the chain-link connecting part 1, that is to say, beneath the broken line a—b indicated in Fig. 2. Tightening of the screw bolt 5 results in narrowing or contraction of the slot 4 and consequently also of the supporting holes 2 and 3 and of vice-like gripping of the chain bolts positioned in the holes 2 and 3.

In the chain-link connecting part 1 illustrated in Figs. 3 to 7 a nut 9, positioned in a blind hole 8, has been associated with the screw bolt 5, whereby after tightening by means of screw bolt 5 the nut 9 rests with a collar 10 against a shoulder 11 formed in the blind hole 8. The nut 9 is provided at its circumference with two oppositely disposed wings 12 and 13 extending parallel to each other in vertical direction and by means of which the nut 9 engages in grooves 14 and 15 of chain bolts 16 and 17 positioned in the holes 2 and 3 of the chain-link connecting part 1. The grooves 14 and 15 correspond with slots 18 and 19 open in outward direction and toward the blind hole. The reference numeral 20 denotes a pin arranged in a bore of the chain-link connecting part 1 and which because of its position between the collar 10 of the screw bolt 5 and the wing 12 of the nut 9 prevents the nut 9 from slipping out of the blind hole 8 after the screw bolt 5 has been screwed out of the nut 9. After the chain-link connecting part 1 has been slipped onto the chain bolts 16 and 17, the nut 9 is arranged in the blind hole 8 of the chain-link connecting part 1 in such manner that it engages with its wings 12 and 13 in the grooves 14 and 15 of the chain bolts 16 and 17. After this the screw bolt 5 is screwed into the nut 9 and tightened until the collar 10 of the nut 9 bears against the shoulder 11 in the blind hole 8, whereby the slot 4 and consequently also the supporting holes 2 and 3 contract and clampingly secure the chain bolts 16 and 17 positioned within them in a vice-like grip.

Figure 8:
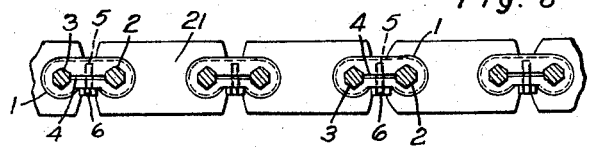
Fig. 8 is a fragmentary front elevational view of a track chain provided with the chain-link connecting parts according to the invention.
Figure 6:
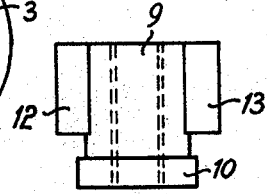
Fig. 6 is a side elevational view of the nut.
Figure 7:
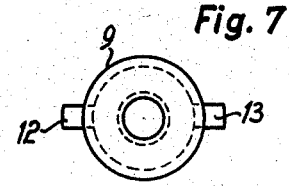
Fig. 7 is a top plan view thereof.
Figure 5:
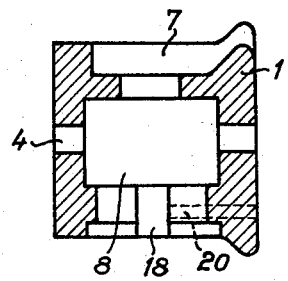
Fig. 5 is a cross section on line V—V of Fig. 4 without screw bolt, nut and chain bolts.
Figure 8:
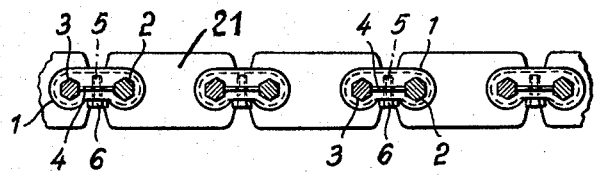

Fig. 8 shows the chain-link connecting parts 1 in position on a track chain 21. The chain bolts of the track chain are clampingly seated in the supporting holes 2 and 3 of the chain link connecting parts 1 by tightly screwing the screw bolts 5 into the latter so that the slots 4 contract, the heads 6 of the screw bolts 5 being located in the contracted portions on the surface of the chain-link connecting parts.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A chain-link connecting part for track chains in combination with appertaining chain bolts, comprising, a chain-link connecting part provided with a pair of oppositely disposed supporting holes for the chain bolts to be supported therein and with a slot terminating at both ends in said holes, said chain-link connecting part being provided in its upper circumference between said supporting holes with a contracted surface portion; a screw bolt provided with a head and screwed in the region of said contracted surface portion into said chain-link connecting part between said supporting holes, said screw bolt traversing said chain-link connecting part and said slot and being so dimensioned that when tightened its head does not project beyond the contracted surface portion in the upper circumference of the chain-link connecting part.

2. A chain-link connecting part for track chains as claimed in claim 1, including a nut surrounding said screw bolt supported within said chain-link connecting part and adapted for tightening with respect to said chain-link connecting part by means of said screw bolt.

3. A chain-link connecting part for track chains as claimed in claim 1, including a nut surrounding said screw bolt supported within said chain-link connecting part and adapted for tightening with respect to said chain-link connecting part by means of said screw bolt, said nut being provided with a pair of oppositely positioned laterally extending wings adapted for engagement in grooves provided in the chain bolts positioned within said supporting holes.

4. A chain-link connecting part for track chains as claimed in claim 1, in which said supporting holes are of polygonal cross section.

References Cited in the file of this patent

UNITED STATES PATENTS

| | | |
|---|---|---|
| Re. 24,331 | Proske | June 18, 1957 |
| 2,089,210 | Knox et al. | Aug. 10, 1937 |
| 2,283,936 | Knox | May 26, 1942 |
| 2,332,976 | Sourer et al. | Oct. 26, 1943 |
| 2,409,207 | Hollenkamp | Oct. 15, 1946 |

UNITED STATES PATENT OFFICE
CERTIFICATION OF CORRECTION

Patent No. 2,957,731            October 25, 1960

Erwin Backhaus

It is hereby certified that error appears in the above numbered patent requiring correction and that the said Letters Patent should read as corrected below.

In the drawings, the present Sheet 2, containing "Fig. 8, should be cancelled; in the heading to "Sheet 1", line 3, strike out "2 Sheets-Sheet 1".

Signed and sealed this 2nd day of May 1961.

(SEAL)
Attest:

ERNEST W. SWIDER
Attesting Officer

DAVID L. LADD
Commissioner of Patents